United States Patent
Matsubara et al.

(10) Patent No.: US 6,791,203 B1
(45) Date of Patent: Sep. 14, 2004

(54) ASSISTANCE CONTROLLING APPARATUS FOR HYBRID VEHICLE

(75) Inventors: Atsushi Matsubara, Wako (JP); Atsushi Izumiura, Wako (JP); Hideyuki Takahashi, Wako (JP); Takashi Kiyomiya, Wako (JP); Hironao Fukuchi, Wako (JP); Katsuhiro Kumagai, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 562 days.

(21) Appl. No.: 09/629,978

(22) Filed: Jul. 31, 2000

(30) Foreign Application Priority Data

Aug. 5, 1999 (JP) .......................................... 11-223135

(51) Int. Cl.[7] .......................... F02N 11/06; H02P 9/04; B60K 6/00
(52) U.S. Cl. .................................... 290/40 C; 180/65.2
(58) Field of Search ...................... 290/40 C; 180/65.2; 60/276

(56) References Cited

U.S. PATENT DOCUMENTS

| | | | | |
|---|---|---|---|---|
| 5,022,263 A | * | 6/1991 | Uriu et al. ...................... 73/295 |
| 5,670,830 A | * | 9/1997 | Koga et al. ................. 307/10.1 |
| 5,789,881 A | * | 8/1998 | Egami et al. ............... 318/139 |
| 5,978,719 A | * | 11/1999 | Yano et al. .................... 701/22 |
| 6,114,775 A | * | 9/2000 | Chung et al. .............. 307/10.1 |
| 6,123,163 A | * | 9/2000 | Otsu et al. .................. 180/65.8 |
| 6,125,625 A | * | 10/2000 | Lipinski et al. .......... 60/39.141 |
| 6,127,813 A | * | 10/2000 | Tamagawa .................... 322/16 |
| 6,166,525 A | * | 12/2000 | Crook .......................... 322/11 |

FOREIGN PATENT DOCUMENTS

| | | |
|---|---|---|
| JP | 10-028302 | 1/1988 |
| JP | 08-019114 | 1/1996 |

OTHER PUBLICATIONS

Copy of Japanese Patent Office Communication dated Oct. 21, 2003 for Corresponding Japanese Patent Application No. 11-223135.

* cited by examiner

Primary Examiner—Burton S. Mullins
Assistant Examiner—Julio Gonzalez
(74) Attorney, Agent, or Firm—Armstrong, Kratz, Quintos, Hanson & Brooks, LLP.

(57) ABSTRACT

This invention relates to an assistance controlling apparatus for a hybrid vehicle which assists an outputs of the engine by an output of the motor.

The assistance controlling apparatus for a hybrid vehicle according to this invention, comprises: an engine which outputs propulsive power for the vehicle; a motor which assists the output of the engine; a remaining quantity detector which detects whether the remaining quantity of the fuel is under a fixed value or not; and an assistance-restricting unit which restricts the assistance of the output of the engine by the motor when the remaining quantity detector detects that the remaining quantity of the fuel is under the fixed value.

27 Claims, 5 Drawing Sheets

ASSISTANCE CONTROLLING APPARATUS FOR HYBRID VEHICLE

BACKGROUND OF THE INVENTION

1. Field of the Invention

This invention relates to an assistance controlling apparatus for a hybrid vehicle which assists the output of the engine by means of the output of a motor.

This application is based on Japanese Patent Application, No. Hei 11-223135 filed in Japan, the content of which is incorporated herein by reference.

2. Description of the Related Art

Conventionally, hybrid vehicles which carry motors as power sources for driving the vehicles in addition to engines are known. As a kind of hybrid vehicle, there is a parallel hybrid vehicle which uses the motor as an auxiliary power source which assists the output of the engine. This parallel hybrid vehicle can satisfy the demands of the driver, for example, by charging the battery by deceleration regeneration and securing the remaining charge of the battery during deceleration, while assisting the engine by means of the motor during acceleration.

Such a parallel hybrid vehicle has the following problem. That is to say, there is a possibility that the driver does not notice that the fuel has run out, because the motor assists the output of the engine when the output of the engine is low, even if the fuel for the engine is running out and the output of the engine is low.

In addition, when the fuel is running out and the ratio of the fuel in the fuel-air mixture introduced into the engine is low, the fuel-air mixture does not burn in the engine. In this condition, when the motor assists the output of the engine and the engine is rotated by the force of the motor, the fuel-air mixture which is not burnt is sent to the exhaust system and the catalyst in this exhaust system may be damaged.

That is to say, there is a possibility that the driver does not notice that there is insufficient fuel, even if the fuel for the engine decreases and the output of the engine decreases, because output is assisted by the motor. Therefore, the driver keeps driving without change, the charge of the battery also decreases, and as a result driving becomes impossible.

SUMMARY OF THE INVENTION

Accordingly, it is an object of the present invention to provide an assistance controlling apparatus for a hybrid vehicle which can inform the driver that the fuel for the engine is running out and which does not damage the catalyst in the exhaust system of the engine.

According to one aspect of this invention, this object can be attained by an assistance controlling apparatus for a hybrid vehicle comprising an engine (e.g., an engine 1 in the embodiment) which outputs propulsive power for the vehicle; a motor (e.g., a motor 2 in the embodiment) which assists the output of the engine; a remaining quantity detector (e.g., a gasoline remaining quantity detector 7 in the embodiment) which detects whether the remaining quantity of the fuel is under a fixed value or not; and an assistance-restricting unit (e.g., a motor control unit 4 in the embodiment) which restricts the assistance of the output of the engine by the motor when the remaining quantity detector detects that the remaining quantity of the fuel is under the fixed value.

With the above structure, because the assistance-restricting unit restricts output assistance by the motor when the remaining quantity detector detects that the remaining quantity of the fuel is under the fixed quantity, the propulsive power of the vehicle, which is equal to the total output of engine and motor, is restricted, and this can reliably inform the driver of the vehicle that the remaining quantity of fuel is under the fixed value.

In addition, it is also possible to prevent over-discharge of the battery for the motor, as a result of restricting the assistance of the output of the engine by the motor during fuel shortage conditions.

According to another aspect of this invention, an assistance controlling apparatus for a hybrid vehicle comprises an alarm unit (e.g., display unit 8 in the embodiment) which gives an alarm when the remaining quantity detector detects that the remaining quantity of the fuel is under the fixed quantity. Because the display unit displays an alarm that the remaining quantity of the fuel is under the fixed quantity, it can more surely inform the driver of the vehicle that the remaining quantity of the fuel is under the fixed value.

According to another aspect of this invention, the assistance-restricting unit stops the assistance of the output of the engine by the motor when the remaining quantity detector detects that the remaining quantity of the fuel is under the fixed quantity. Accordingly, the fuel-air mixture which becomes thin and impossible to burn due to the shortage of the fuel is not sent to exhaust system by the engine being forced to rotate by the output assistance of the motor, and the catalyst in exhaust system is not damaged. In addition, over-discharge of the battery can also be prevented because the assistance of the output of the engine by the motor is stopped.

According to another aspect of this invention, the assistance-restricting unit reduces the output assistance quantity by the motor gradually, when the remaining quantity detector detects that the remaining quantity of the fuel is under the fixed value. Accordingly, the driver of the vehicle can be safely informed that the remaining quantity of the fuel is under the fixed value. It is also possible to prevent over-discharge of the battery for the motor.

DESCRIPTION OF THE PREFERRED EMBODIMENTS

The following embodiment does not limit the invention according to the claims. In addition, in order to attain the object, combination of all the characteristics explained in the embodiment is not always necessary.

Figure 1:
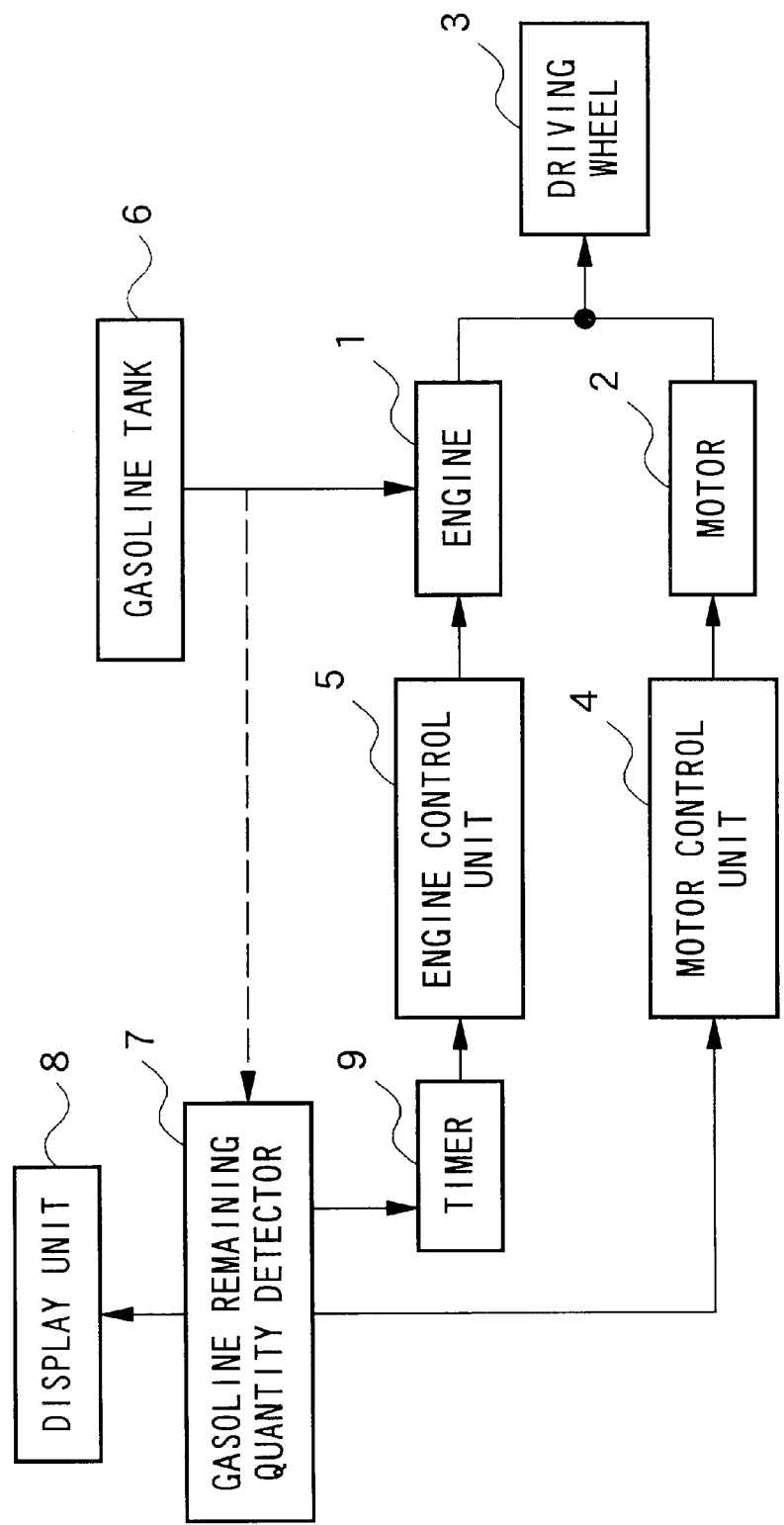
FIG. 1 is a block diagram of an assistance controlling apparatus for a hybrid vehicle which is an embodiment of this invention.

In FIG. 1, a block diagram of an assistance controlling apparatus for a hybrid vehicle which is an embodiment of this invention is shown. The following are transmitted to driving wheel 3 of the vehicle: output of engine 1 driven by the gasoline as the fuel and output of motor 2 driven by electricity. The motor 2 is controlled by motor control unit 4, and the engine 1 is controlled by engine control unit 5. In addition, the fuel which is the gasoline from gasoline tank 6 is supplied to the engine 1.

Gasoline remaining quantity detector 7 detects the remaining quantity of the gasoline from the feed rate of the gasoline. As a concrete method for detecting the remaining quantity of the gasoline, there is a method for detecting KAF, namely the ratio of air and gasoline (fuel) in the fuel-air mixture introduced in the engine 1. That is to say, when the gasoline remaining quantity decreases, sufficient gasoline is not supplied in the fuel-air mixture, the air ratio with respect to the gasoline in the fuel-air mixture rises, and the KAF rises.

In addition, there is another method of using a remaining quantity detector installed in the gasoline tank 6 for detecting the remaining quantity of the gasoline.

The results detected by this type of gasoline remaining quantity detector 7 are sent to display unit 8, and the display unit 8 displays sent detection results. Furthermore, gasoline remaining quantity detector 7 controls the motor control unit 4 and timer 9 based on the detection results. Based on a measured time value in this timer 9, the timer 9 controls the engine control unit 5.

Figure 2:
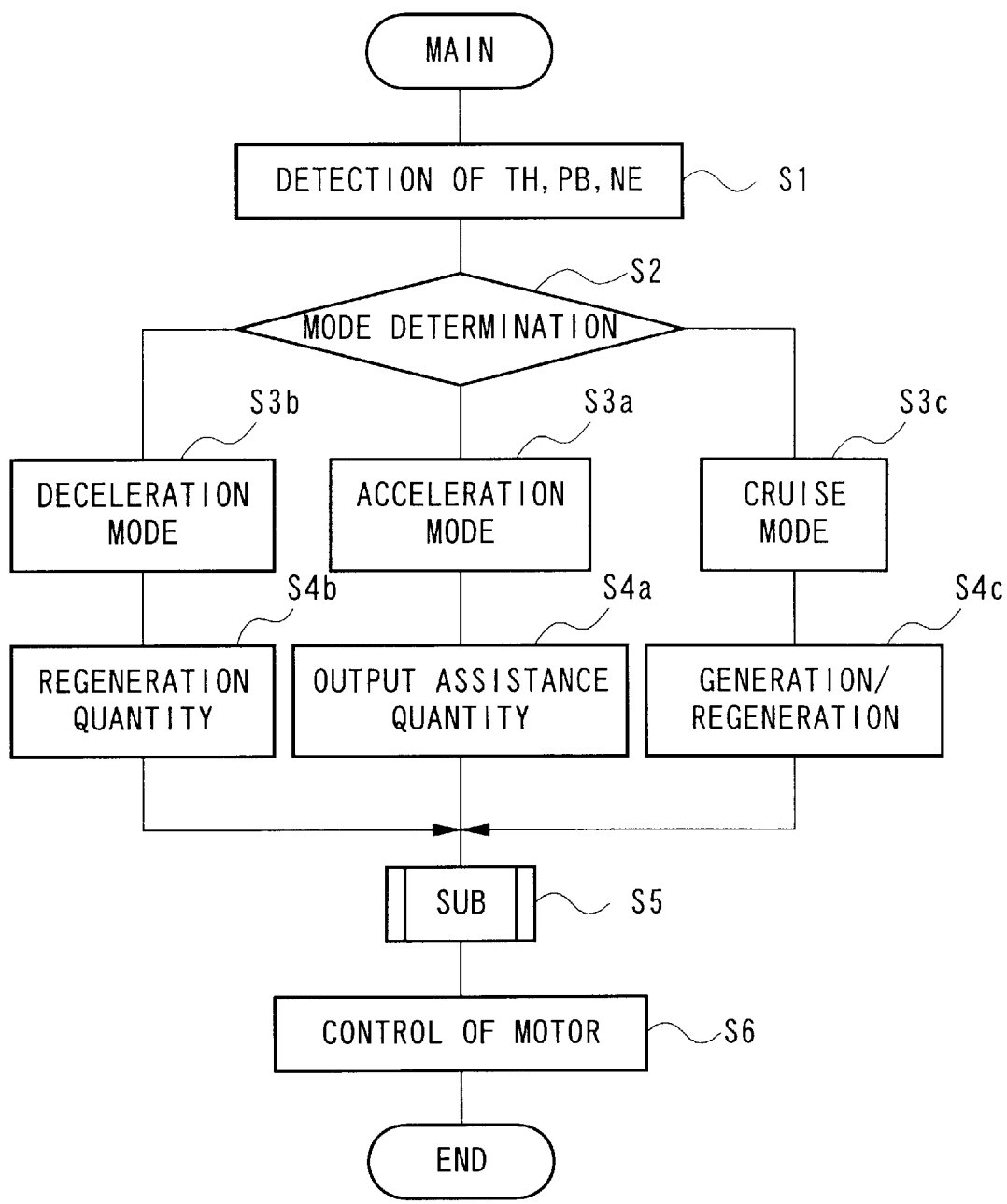
FIG. 2 is a flowchart showing the main flow for controlling the motor.

Next, the operation of the embodiment is explained referring to the flowchart of FIG. 2. FIG. 2 is the main flow for controlling the motor 2. Codes such as S1 in following sentences indicate the steps in the flowchart.

To begin with, the throttle opening TH, the air intake passage pressure PB, and the engine rotational speed NE are detected (S1), and a mode determination is carried out based on the detected results (S2). Namely, one of acceleration mode (S3a), deceleration mode (S3b) and cruise mode (S3c) is chosen.

The driving force of the engine 1 is assisted by the driving force of motor 2 when the acceleration mode (S3a) is chosen. At this time, the output assistance quantity by the motor is determined in proportion to the required acceleration quantity (S4a). Regenerative braking is executed by the motor 2, when the deceleration mode (S3b) is chosen. At this time, the regeneration quantity by the motor is determined in proportion to the required deceleration quantity (S4b). Power generation and a regeneration quantity are determined when the cruise mode (S3c) is chosen, and because the vehicle is running only by the drive force of the engine 1 and the motor 2 is not being driven, the motor 2 is used as a generator (S4c).

Next, the subroutine for correcting the output assistance quantity for the motor and the display of the gasoline remaining quantity based on the remaining quantity of the gasoline is executed (S5). The operation of this subroutine is explained in detail later.

Finally, the motor is controlled based on the decisions for the output assistance quantity, etc. by the operation described above (S6).

Figure 3:
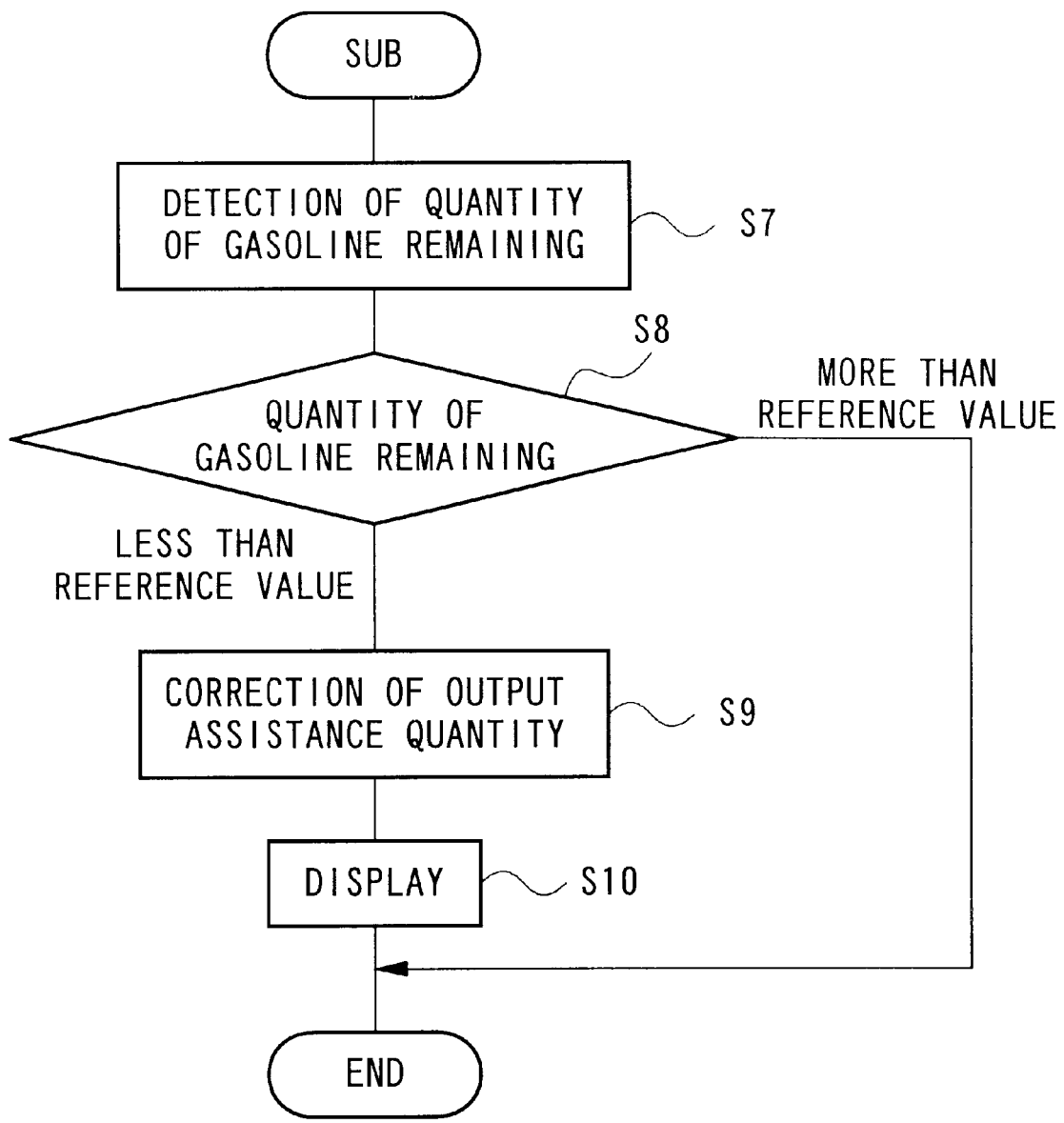
FIG. 3 is a flowchart showing the subroutine which carries out compensation of the output assistance quantity by the motor, and display of the gasoline remaining quantity.

Next, referring to FIG. 3, the operation of said subroutine is explained in detail. To begin with, the remaining quantity of the gasoline is detected by gasoline remaining quantity detector 7 (S7). Then, this detected result and predetermined reference value are compared. When the gasoline remaining quantity is more than the reference value, the following steps S9 and S10 are omitted and the subroutine ends. When the gasoline remaining quantity is less than the reference value, the process advances to the next step S9.

In the next step S9, the output assistance quantity for the motor is corrected. That is to say, when the gasoline remaining quantity is less than the reference value, the output assistance quantity for the motor is corrected, in other words limited. The details of this correction is described later.

Next, the fact that the gasoline remaining quantity is less than the reference value is displayed by the display unit 8, and the display draws the driver's attention. The above is an operation of the subroutine which is shown in FIG. 3.

Figure 4:
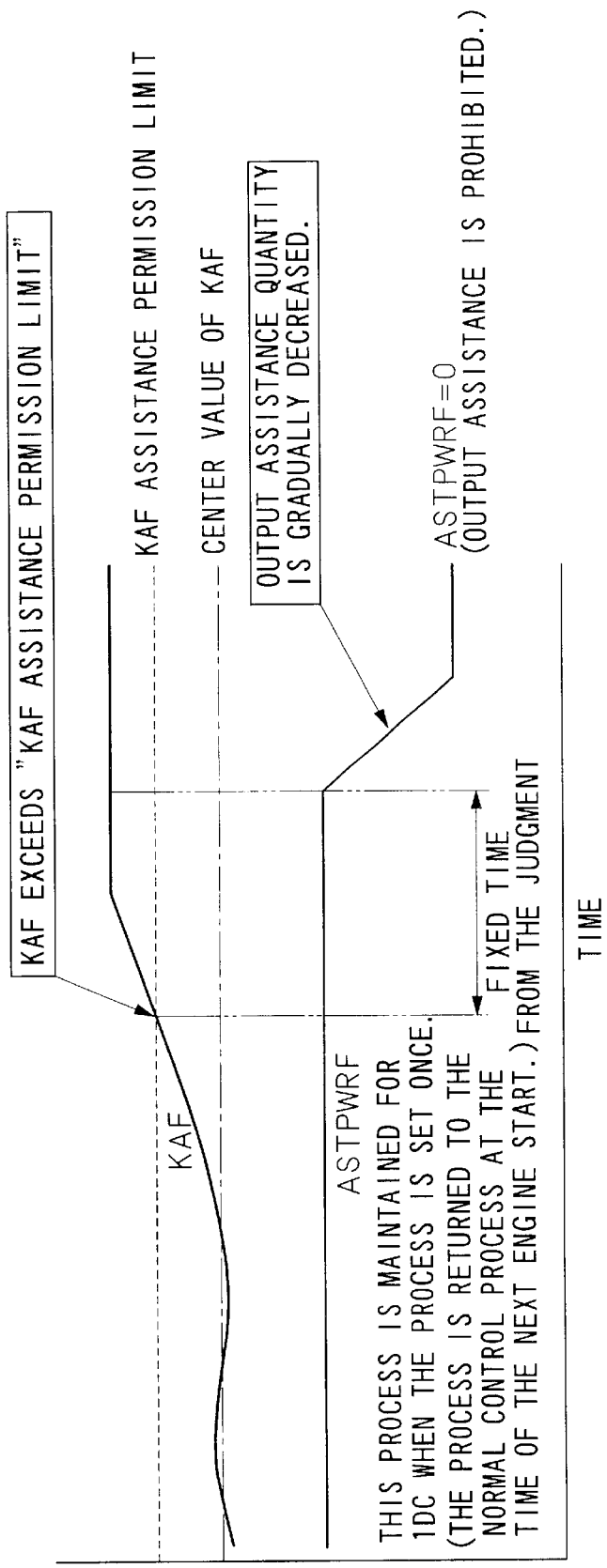
FIG. 4 is a conceptual scheme for explaining the operation from detection of the gasoline remaining quantity to correction of output assistance quantity by the motor.

Next, referring to the operation conceptual scheme of FIG. 4, the operation from detection of the gasoline remaining quantity to correction of the output assistance quantity for the motor is explained in detail.

The gasoline remaining quantity is detected by detecting the KAF. The KAF is the ratio of air and gasoline (fuel) in the fuel-air mixture introduced into the engine. That is to say, when the gasoline remaining quantity decreases, sufficient gasoline is not supplied in the fuel-air mixture, and the air ratio increases relatively, and the KAF rises.

When the KAF exceeds a predetermined reference value, namely the "KAF assistance permission limit" in FIG. 4, it is judged that the quantity of gasoline remaining is little. Then, in the example of FIG. 4, after a fixed time from the judgement has passed, the KAF is checked again, and if the KAF exceeds the reference value again, the correction of the output assistance quantity by the motor is started. This is because the output assistance quantity is not to be corrected if the supply of the gasoline temporarily decreases due to vibrations and tilting of the car body, for example. The correction of the output assistance quantity shown in FIG. 4 makes the out assistance quantity "ASTPWRF" gradually decrease, and the output assistance quantity is finally made to be 0.

By doing this in this way, it is possible to reliably bring to attention of the driver that there is little gasoline remaining quantity. That is to say, it is difficult for the driver to know that the quantity of gasoline remaining has decreased, because the motor assists the engine in conventional hybrid vehicles, even if the quantity of gasoline remaining decreases and the output of the engine falls. At this time, by using the assistance controlling apparatus of the present invention, it is possible for the driver to know with certainty that the quantity of gasoline remaining is low, because the amount of output assistance from the motor is decreased and the sum total of output that is transmitted to the driving wheel decreases when the quantity of gasoline remaining is low.

Figure 5:
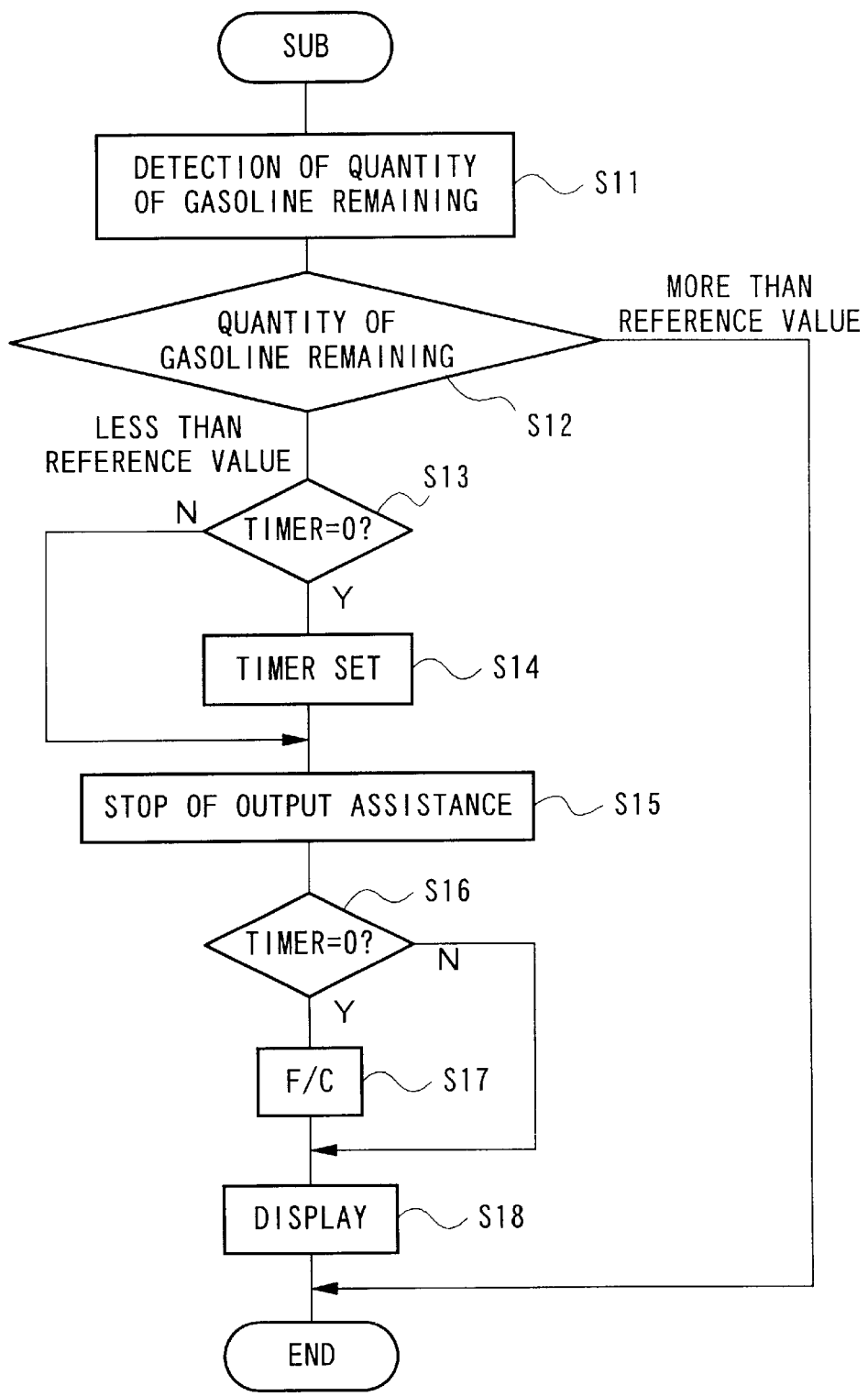
FIG. 5 is a flowchart showing another embodiment of the subroutine which carries out correction of the output assistance quantity by the motor and display of the gasoline remaining quantity.

Next, another embodiment of said subroutine is explained referring to the flowchart of FIG. 5. To begin with, the quantity of gasoline remaining is detected by the gasoline remaining quantity detector 7 (S11). The process branches based on the result of the detection (S12). All the following steps are omitted and this subroutine ends when the quantity of gasoline remaining is more than the reference value. The process advances to the next step S13, when the quantity of the gasoline remaining is less than the reference value.

In the next step S13, time measured value in timer 9 is examined to determine whether it is 0 or not, and if the time measured value is 0, the process advances to the next step S14. If it is not 0, step S14 is omitted and the process advances to step S15.

In S14, the time measured value in timer 9 is set at the initial value. This timer 9 starts the time measurement when it is set, and time measured value decreases from the initial value with the progress of the time.

That is to say, step S14 of the timer set is executed, only when the time measured value in timer 9 is 0. The time measured value in timer 9 is made to be 0, when the power of the assistance controlling apparatus is turned on. Therefore, the case in which the time measured value in timer 9 is 0 is the case in which this subroutine is executed for the first time after the power of the assistance controlling apparatus is turned on. On that particular occasion only is step S14 of the timer set executed.

Next, the assistance of the output of the engine by the motor is cut (S15). That is to say, the assistance of the output of the engine by the motor is completely cut, when it is judged that the quantity of the gasoline remaining is low.

The remaining quantity of gasoline decreases and sufficient gasoline is not supplied to the engine, the ratio of the gasoline which is included in the fuel-air mixture introduced into the engine falls, and the fuel-air mixture cannot be burnt in the engine. In this condition, the engine is compulsorily rotated by the driving force of the motor if the assistance of the output of the engine by the motor is carried out, and the fuel-air mixture which is not burning is sent to the catalyst of the exhaust system, and the catalyst is damaged.

At this time, according to this invention, when the remaining quantity of the gasoline is low, the assistance of the output of the engine by the motor is completely cut. Accordingly, if the concentration of the fuel-air mixture falls and the fuel-air mixture cannot be burnt, the rotation of the engine stops, the fuel-air mixture which is not burnt is not sent to exhaust system, and the catalyst is not damaged.

Next, the time measured value in timer 9 is examined again, and the process branches based on this result (S16). That is to say, the process advances to the next step S17 if the time measured value is 0. If it is not 0, the next step S17 is omitted and the process advances to S18.

In S17, the supply of the gasoline is cut. That is to say, the supply of gasoline is cut, after the quantity of the gasoline remaining decreases and the timer is set, and the time set in the timer passes. As a result, it is possible to prevent with certainty the fuel-air mixture which has not been burnt from being sent to the exhaust system.

In S18, the fact that the quantity of the gasoline remaining is low is displayed by display unit 8, and the driver is made aware of this fact. The operation of this subroutine ends in the above.

What is claimed is:

1. An assistance controlling apparatus for a hybrid vehicle, comprising:
    an engine which outputs propulsive power for the vehicle;
    a motor which assists the output of the engine;
    a remaining quantity detector which detects whether the remaining quantity of the fuel is under a fixed value or not; and
    an assistance-restricting unit which restricts the assistance of the output of the engine by said motor when the remaining quantity detector detects that the remaining quantity of the fuel is under the fixed value.

2. An assistance controlling apparatus for a hybrid vehicle according to claim 1, further comprising an alarm unit which gives an alarm when the remaining quantity detector detects that the remaining quantity of the fuel is under the fixed value.

3. An assistance controlling apparatus for a hybrid vehicle according to claim 1, wherein the assistance-restricting unit stops the assistance of the output of the engine by said motor when the remaining quantity detector detects that the remaining quantity of the fuel is under the fixed value.

4. An assistance controlling apparatus for a hybrid vehicle according to claim 2, wherein the assistance-restricting unit stops the assistance of the output of the engine by said motor when the remaining quantity detector detects that the remaining quantity of the fuel is under the fixed value.

5. An assistance controlling apparatus for a hybrid vehicle according to claim 1, wherein the assistance-restricting unit decreases the output assistance quantity by said motor gradually when the remaining quantity detector detects that the remaining quantity of the fuel is under the fixed value.

6. An assistance controlling apparatus for a hybrid vehicle according to claim 2, wherein the assistance-restricting unit decreases the output assistance quantity by said motor gradually when the remaining quantity detector detects that the remaining quantity of the fuel is under the fixed value.

7. An assistance controlling apparatus for a hybrid vehicle according to claim 1, wherein the remaining quantity detector detects the remaining quantity of the fuel from the ratio of air and fuel in the fuel-air mixture introduced in the engine.

8. An assistance controlling apparatus for a hybrid vehicle according to claim 2, wherein the remaining quantity detector detects the remaining quantity of the fuel from the ratio of air and fuel in the fuel-air mixture introduced in the engine.

9. An assistance controlling apparatus for a hybrid vehicle according to claim 3, wherein the remaining quantity detector detects the remaining quantity of the fuel from the ratio of air and fuel in the fuel-air mixture introduced in the engine.

10. An assistance controlling apparatus for a hybrid vehicle according to claim 4, wherein the remaining quantity detector detects the remaining quantity of the fuel from the ratio of air and fuel in the fuel-air mixture introduced in the engine.

11. An assistance controlling apparatus for a hybrid vehicle according to claim 5, wherein the remaining quantity detector detects the remaining quantity of the fuel from the ratio of air and fuel in the fuel-air mixture introduced in the engine.

12. An assistance controlling apparatus for a hybrid vehicle according to claim 6, wherein the remaining quantity detector detects the remaining quantity of the fuel from the ratio of air and fuel in the fuel-air mixture introduced in the engine.

13. An assistance controlling apparatus for a hybrid vehicle according to claim 1, wherein the remaining quantity detector detects the remaining quantity of the fuel in a fuel tank.

14. An assistance controlling apparatus for a hybrid vehicle according to claim 2, wherein the remaining quantity detector detects the remaining quantity of the fuel in a fuel tank.

15. An assistance controlling apparatus for a hybrid vehicle according to claim 3, wherein the remaining quantity detector detects the remaining quantity of the fuel in a fuel tank.

16. An assistance controlling apparatus for a hybrid vehicle according to claim 4, wherein the remaining quantity detector detects the remaining quantity of the fuel in a fuel tank.

17. An assistance controlling apparatus for a hybrid vehicle according to claim 5, wherein the remaining quantity detector detects the remaining quantity of the fuel in a fuel tank.

18. An assistance controlling apparatus for a hybrid vehicle according to claim 6, wherein the remaining quantity detector detects the remaining quantity of the fuel in a fuel tank.

19. An assistance controlling apparatus for a hybrid vehicle, comprising:

an engine which outputs propulsive power for the vehicle;

a motor which assists the output of the engine;

a remaining quantity detector which detects whether the remaining quantity of the fuel is under a fixed value or not by detecting the remaining quantity of the fuel from the ratio of air and fuel in the fuel-air mixture introduced in the engine; and an assistance-restricting unit which restricts the assistance of the output of the engine by said motor by controlling an output assistance quantity by said motor when the remaining quantity detector detects that the remaining quantity of the fuel is under the fixed value.

20. An assistance controlling apparatus for a hybrid vehicle according to claim 19, further comprising an alarm unit which gives an alarm when the remaining quantity detector detects that the remaining quantity of the fuel is under the fixed value.

21. An assistance controlling apparatus for a hybrid vehicle according to claim 19, wherein the assistance-restricting unit stops the assistance of the output of the engine by said motor when the remaining quantity detector detects that the remaining quantity of the fuel is under the fixed value.

22. An assistance controlling apparatus for a hybrid vehicle according to claim 19, wherein the assistance-restricting unit decreases the output assistance quantity by said motor gradually when the remaining quantity detector detects that the remaining quantity of the fuel is under the fixed value.

23. An assistance controlling apparatus for a hybrid vehicle, comprising:

an engine which outputs propulsive power for the vehicle;

a motor which assists the output of the engine;

a remaining quantity detector which detects whether the remaining quantity of the fuel is under a fixed value or not by detecting the remaining quantity of the fuel in a fuel tank; and an assistance-restricting unit which restricts the assistance of the output of the engine by said motor by restricting an output assistance quantity by said motor when the remaining quantity detector detects that the remaining quantity of the fuel is under the fixed value.

24. An assistance controlling apparatus for a hybrid vehicle according to claim 23, further comprising an alarm unit which gives an alarm when the remaining quantity detector detects that the remaining quantity of the fuel is under the fixed value.

25. An assistance controlling apparatus for a hybrid vehicle according to claim 23, wherein the assistance-restricting unit stops the assistance of the output of the engine by said motor when the remaining quantity detector detects that the remaining quantity of the fuel is under the fixed value.

26. An assistance controlling apparatus for a hybrid vehicle according to claim 23, wherein the assistance-restricting unit decreases the output assistance quantity by said motor gradually when the remaining quantity detector detects that the remaining quantity of the fuel is under the fixed value.

27. An assistance controlling apparatus for a hybrid vehicle according to claim 1, whereby catalyst damage is prevented.

* * * * *